US008483905B2

(12) United States Patent
Toda et al.

(10) Patent No.: US 8,483,905 B2
(45) Date of Patent: Jul. 9, 2013

(54) ENERGIZATION CONTROL APPARATUS FOR CONTROLLED COMPONENT FOR A VEHICLE

(75) Inventors: Satoru Toda, Nagoya (JP); Kunihiko Takamatsu, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 570 days.

(21) Appl. No.: 12/753,610

(22) Filed: Apr. 2, 2010

(65) Prior Publication Data

US 2010/0256866 A1 Oct. 7, 2010

(30) Foreign Application Priority Data

Apr. 2, 2009 (JP) .................................. 2009-89981

(51) Int. Cl.
*G06F 7/00* (2006.01)

(52) U.S. Cl.
USPC ........................................................ 701/34.4

(58) Field of Classification Search
USPC ........................................................... 701/34
See application file for complete search history.

(56) References Cited

FOREIGN PATENT DOCUMENTS

JP 2007-211714 * 8/2007
JP 2007-211714 A 8/2007

* cited by examiner

*Primary Examiner* — Thomas Tarcza
*Assistant Examiner* — Maceeh Anwari
(74) *Attorney, Agent, or Firm* — Sughrue Mion, PLLC

(57) ABSTRACT

An energization control apparatus (30) includes an FET (32), a thermistor (34) and anomaly detection means (36). The anomaly detection means (36) includes temperature-difference calculation means (45) and sensitivity anomaly determination means (41). The temperature-difference calculation means (45) acquires a first temperature measured by the thermistor (34) before startup of a vehicle or within a fixed period after the startup, acquires a second temperature measured by the thermistor (34) at the time when a predetermined wait time has elapsed from the time of acquisition of the first temperature, and calculates the difference therebetween. The sensitivity anomaly determination means (41) determines, from the difference, an anomaly of the thermistor (34) associated with its sensitivity to a temperature to be measured.

12 Claims, 9 Drawing Sheets

ENERGIZATION CONTROL APPARATUS FOR CONTROLLED COMPONENT FOR A VEHICLE

BACKGROUND OF THE INVENTION

1. Field of the Invention

The present invention relates to an energization control apparatus for controlling the supply of electric current to a controlled component for a vehicle (hereinafter referred to as a "controlled vehicle component") such as a glow plug.

2. Background of the Invention

Conventionally, various energization control apparatuses have been used to control the supply of electric current to controlled vehicle components, such as glow plugs used for diesel engines and heaters for heating various sensors (for example, an oxygen sensor, an $NO_X$ sensor, etc.) mounted on vehicles. A known energization control apparatus includes switching means (for example, an FET, etc.) for opening and closing a path through which electric current is supplied from a battery to a controlled vehicle component, and a computation device for turning the switching means on and off. Also, in general, such an energization control apparatus includes a temperature-sensitive element (for example, a thermistor, etc.) for protecting the switching element, such as an FET, from overheating.

On the other hand, for accurate detection of a heat-generated state by a temperature-sensitive element, the temperature-sensitive element must operate normally. Therefore, a method for detecting a failure in operation of a temperature-sensitive element has been proposed (see, for example, Patent Document 1). In the known method, a plurality of temperature-sensitive elements are provided, and, at the time of startup of a vehicle, the respective temperatures detected by the temperature-sensitive elements are compared with the ambient temperature. When the difference between the temperature detected by a certain temperature-sensitive element and the ambient temperature is greater than the differences between the temperatures detected by the other temperature-sensitive elements and the ambient temperature, a determination is made that the subject temperature-sensitive element has failed. This method makes it possible to detect not only wire-breakage, open failure, and short-circuit of a temperature-sensitive element, but also an anomalous state in which the detected temperature shifts to the high-temperature side or the low-temperature side due to deterioration of the temperature-sensitive element or other causes (high-temperature-side-shift anomaly or low-temperature-side-shift anomaly).

[Patent Document 1] Japanese Patent Application Laid-Open (kokai) No. 2007-211714

3. Problems to be Solved by the Invention

Ideally, electronic components which constitute an energization control apparatus, a harness connected to the energization control apparatus, and a controlled component such as a glow plug are fabricated with the intent that they do not exhibit any variance. However, since these are industrial products, in actuality, they do have tolerances; for example, several percent on plus and minus sides in relation to a center value, or several percent on the plus or minus side only (for example, on the minus side only (minus variation)). Here, an example case here will be considered where the switching means is an FET, and the controlled vehicle component is a glow plug. In such an example case, the amount of heat generated by the FET as a result of supply of electric current to the controlled vehicle component (glow plug) is affected by the resistance of the glow plug. For example, by comparing the case where a glow plug whose resistance is equal to the upper limit of the tolerance (allowable range for use) is connected to an energization control apparatus and the case where a glow plug whose resistance is equal to the lower limit of the tolerance is connected to the energization control apparatus, the FET is found to generate a larger amount of heat in the case where the glow plug whose resistance is equal to the upper limit of the tolerance is connected to the energization control apparatus.

Further, a detected temperature may greatly vary according to a position of a temperature-sensitive element, depending on whether it is disposed near the switching means or disposed at a location separated from the switching means. Due to a difference in the structure of the controlled vehicle component and a difference in the position of the temperature-sensitive element, the method described in Patent Document 1 may erroneously determine that a temperature-sensitive element is defective.

Moreover, when the above-described method is employed, at least two temperature-sensitive elements must be provided, which results in an increase in production cost.

SUMMARY OF THE INVENTION

The present invention has been accomplished in view of the forgoing problems, and an object thereof is to provide an energization control apparatus for a controlled vehicle component which includes a temperature-sensitive element and which can more accurately detect an anomaly of the temperature-sensitive element.

Various configurations suitable for achieving the above-described object of the invention are described below. As needed, the action and effects specific to each of the configurations will be described as well.

Configuration 1. An energization control apparatus for a controlled vehicle component comprising: switching means disposed on a substrate and generating heat when supplying electric current from a power supply to a controlled vehicle component; a temperature-sensitive element disposed on the substrate; and anomaly detection means for detecting an anomaly of the temperature-sensitive element, wherein the anomaly detection means comprises: temperature-difference calculation means for acquiring a first physical quantity containing information regarding temperature of the temperature-sensitive element before startup of a vehicle or within a fixed period after startup, for acquiring a second physical quantity containing information regarding the temperature of the temperature-sensitive element after elapse of a predetermined wait time from the time of acquisition of the first physical quantity, and for calculating a difference between the first physical quantity and the second physical quantity; and sensitivity anomaly determination means for determining, from the difference, an anomaly of the temperature-sensitive element associated with sensitivity to a temperature to be measured.

Notably, the "controlled vehicle component" refers to a load which is driven by supply of electric current thereto and which may cause the switching means to generate heat as a result of supply of electric current from the power supply to the load. Examples of the "controlled vehicle component" include those to which a relatively large electric current is supplied from the power supply (those which may cause the switching means to generation heat), such as a glow plug, a heater used for an oxygen sensor, an $NO_X$ sensor, or the like, and a motor used in a hybrid vehicle or the like.

Further, each of the "first physical quantity containing temperature information" and the "second physical quantity containing temperature information" is not limited to temperature detected by the temperature-sensitive element, and may be any other physical quantity which changes in accordance with the temperature. Examples of such a physical quantity include the resistance of the temperature-sensitive element, and a voltage which is developed across the temperature-sensitive element and which changes in accordance with its resistance.

In addition, examples of the "switching means" include an FET, a transistor, an IBGT (insulated-gate bipolar transistor), and a mechanical relay.

Further, examples of the "temperature-sensitive element" include a thermistor and a platinum resistor.

Moreover, the "wait time" is set in consideration of the fact that the switching means generates heat when electric current is supplied to the controlled vehicle component. Specifically, in the case where the temperature-sensitive element is disposed near the switching means or in the case where the switching means may generate a large amount of heat because of the configuration of the controlled vehicle component or other factors, the wait time is set to be relatively short. Meanwhile, in the case where the temperature-sensitive element is disposed at a location remote from the switching means, the wait time is set to be relatively long (this also applies to the following description).

When the temperature-sensitive element suffers an anomaly, such as an anomaly in which the temperature characteristic of the temperature-sensitive element has shifted to the high-temperature side or the low-temperature side, or an anomaly in which the resistance of the temperature-sensitive element hardly changes irrespective of the ambient temperature, a change in the temperature|detected| by the temperature-sensitive element when electric current is supplied to the controlled vehicle component becomes different from that detected when the temperature-sensitive element is normal.

In view of the foregoing, according to Configuration 1, the sensitivity anomaly determination means determines the occurrence of an anomaly of the temperature-sensitive element associated with its sensitivity on the basis of the difference of first and second physical quantities, wherein the first physical quantity is acquired before startup of a vehicle or within a fixed period after startup (in other words, is acquired before the switching means generates heat), and the second physical quantity is acquired after elapse of a predetermined wait time from the time of acquisition of the first physical quantity (in other words, after the supply of electric current to the controlled vehicle component has begun and the switching means has generated some heat). That is, since the anomaly determination is performed based on this difference, which assumes greatly different values between the case where the temperature-sensitive element is normal and the case where the temperature-sensitive element is anomalous, an anomaly of the temperature-sensitive element associated with its sensitivity to a temperature to be measured can be detected accurately.

Further, according to Configuration 1, an anomaly can be detected by monitoring the output from a single temperature-sensitive element without requiring a plurality of temperature-sensitive elements as in the case of the above-mentioned related art technique. Therefore, an increase in production cost, which increase would otherwise result from providing a plurality of temperature-sensitive elements, can be avoided. Further, in the case where outputs from a plurality of temperature-sensitive elements are utilized, as described above, a situation may occur in which an erroneous determination is made due to a difference in positional relation between each temperature-sensitive element and the switching means and other factors. In contrast, in the case of the energization control apparatus of the present configuration which monitors the output of a single temperature-sensitive element, such a situation does not occur. Therefore, accuracy in detecting an anomaly of the temperature-sensitive element can be further improved.

Notably, the timing for acquiring the first physical quantity may be arbitrarily determined so long as the determined timing is before the switching means generates heat (before startup of the vehicle or within a fixed period after the startup). However, immediately after startup of the vehicle, the acquired first physical quantity may include some noise stemming, for example, from a current surge flowing through the controlled vehicle component. Accordingly, in order to further improve the anomaly detection accuracy, preferably, the first physical quantity is acquired before startup of the vehicle or within the above-mentioned fixed period after elapse of a short period of time (e.g., 1 sec) from startup of the vehicle (that is, after the current surge has abated). Further, in order to reduce the processing load of the temperature-difference calculation means, preferably, the "first physical quantity" and the "second physical quantity" are of the same type (e.g., both are resistance values).

Notably, whereas an anomaly of the temperature-sensitive element associated with its sensitivity can be detected by Configuration 1, the mode of the anomaly can be determined by Configurations 2 and 3 described below.

Configuration 2. In the energization control apparatus for a controlled vehicle component according to the above-described Configuration 1, the sensitivity anomaly determination means comprises at least one determination means selected from the group consisting of: first determination means for determining whether or not the difference is greater than a predetermined first threshold; second determination means for determining whether or not the difference is not greater than a predetermined second threshold smaller than the first threshold and is greater than a predetermined third threshold smaller than the second threshold; and third determination means for determining whether or not the absolute value of the difference is not greater than the third threshold.

Notably, the "first threshold" is determined by use of a normal (i.e., a correctly functioning) temperature-sensitive element. Specifically, the first threshold is determined based on the maximum value of a physical quantity (e.g., resistance) which can change in a period between a point in time before the controlled vehicle component generates heat and a point in time when the predetermined wait time has elapsed after the start of supply of electric current to the controlled vehicle component. That is, the first threshold is equal to the maximum value that can be calculated as the difference between the first physical quantity and the second physical quantity when using a normal temperature-sensitive element. Further, the "second threshold" is determined by use of a normal temperature-sensitive element. Specifically, the second threshold is determined based on the minimum value of the physical quantity (e.g., resistance) which can change between a point in time before the controlled vehicle component generates heat and a point in time when the predetermined wait time has elapsed after the start of supply of electric current to the controlled vehicle component. That is, the second threshold is equal to the minimum value that can be calculated as the difference between the first physical quantity and the second physical quantity when using a normal temperature-sensitive element. The "third threshold" is a value between zero and the second threshold. The third threshold can be set based on a variation of the physical quantity of a normal temperature-sensitive element, which variation occurs when the normal temperature-sensitive element is placed in an environment whose temperature is constant.

According to Configuration 2, the sensitivity anomaly determination means includes at least one of the first determination means, the second determination means, and the third determination means.

Here, the case will be considered where the temperature-sensitive element has an anomaly in which the temperature characteristic of the temperature-sensitive element has shifted to the high-temperature side. In the case of such an anomalous temperature-sensitive element, its resistance decreases in a greater amount in the period between a point in time before the controlled vehicle component generates heat and a point in time when the predetermined wait time has elapsed after the start of supply of electric current to the controlled vehicle component, as compared with a normal temperature-sensitive element. Accordingly, in the case of the anomalous temperature-sensitive element, the second physical quantity assumes a value which is considerably larger or smaller than the value of the second physical quantity acquired in the case of the normal temperature-sensitive element. Further, as indicated by curve A of FIG. 7 (notably, FIG. 7 shows the case where temperature is acquired as the physical quantity), the difference between the first physical quantity and the second physical quantity becomes larger than the difference obtained in the case of the normal temperature-sensitive element (curve B of FIG. 7). In consideration thereof, the first determination means determines whether or not the difference is greater than the previously set first threshold, whereby the determination as to whether or not the temperature characteristic of the temperature-sensitive element has shifted to the high-temperature side can be performed accurately.

Next, the case will be considered where the temperature-sensitive element has an anomaly in which the temperature characteristic of the temperature-sensitive element has shifted to the low-temperature side. In the case of such an anomalous temperature-sensitive element, its resistance decreases in a smaller amount in the period between a point in time before the controlled vehicle component generates heat and a point in time when the predetermined wait time has elapsed after the start of supply of electric current to the controlled vehicle component, as compared with a normal temperature-sensitive element. Accordingly, as indicated by curve C of FIG. 7, in the case of the anomalous temperature-sensitive element, a change of the second physical quantity from the first physical value becomes smaller as compared with the case of the normal temperature-sensitive element, and, the difference between the first physical quantity and the second physical quantity becomes smaller than the difference obtained in the case of the normal temperature-sensitive element. By utilizing this feature, the second determination means determines whether or not the difference is greater than the third threshold and not greater than the second threshold, whereby the determination as to whether or not the temperature characteristic of the temperature-sensitive element has shifted to the low-temperature side can be performed accurately.

Further, the case will be considered where the temperature-sensitive element has an anomaly in which the resistance of the temperature-sensitive element hardly changes irrespective of the ambient temperature. In such a case, as indicated by curve D of FIG. 7, the first physical quantity acquired at a point in time before the controlled vehicle component generates heat and the second physical quantity acquired after elapse of the predetermined wait time become approximately equal to each other. Accordingly, the third determination means determines whether or not the absolute value of the difference is not greater than the third threshold, whereby the determination as to whether or not the temperature-sensitive element has a "stuck" or rather invariance anomaly in which the resistance of the temperature-sensitive element does not appreciably change can be performed accurately (i.e., where the temperature-sensitive element is nonresponsive).

As noted above, the above-mentioned various determination means can determine various modes of anomaly; i.e., high-temperature-side-shift anomaly, low-temperature-side-shift anomaly, and invariance anomaly, whereby an anomaly of the temperature-sensitive element can be detected more accurately.

Configuration 3. In the energization control apparatus for a controlled vehicle component according to the above-described Configuration 1 or 2, the sensitivity anomaly determination means further comprises at least one determination means selected from the group consisting of: fourth determination means for determining whether or not an output value based on the resistance of the temperature-sensitive element is greater than a predetermined maximum allowable value; and fifth determination means for determining whether or not the output value based on the resistance of the temperature-sensitive element is less than a predetermined minimum allowable value.

Notably, the "maximum allowable value" refers to a voltage value based on the maximum resistance within a variation range of the resistance of a normal temperature-sensitive element, a value acquired through A/D conversion of the voltage value, or the like. Further, the "minimum allowable value" refers to a voltage value based on the minimum resistance within the variation range of the resistance of the normal temperature-sensitive element, a value acquired through A/D conversion of the voltage value, or the like (this also applies to the following description).

According to Configuration 3, the sensitivity anomaly detection means includes at least one of the fourth determination means and the fifth determination means. When a temperature-sensitive element has a wire-breakage or open failure, the resistance of the temperature-sensitive element becomes greater than the upper limit of a range in which the resistance of a normal temperature-sensitive element can change. Accordingly, the fourth determination means determines whether or not the output value from the temperature-sensitive element side is greater than the maximum allowable value, whereby the wire-breakage or open failure of the temperature-sensitive element can be accurately detected.

Meanwhile, when a short-circuit is formed in a temperature-sensitive element, the resistance of the temperature-sensitive element becomes smaller than the lower limit of the range in which the resistance of the normal temperature-sensitive element can change. Accordingly, the fifth determination means determines whether or not the output value from the temperature-sensitive element side is less than the minimum allowable value, whereby a short-circuit of the temperature-sensitive element can be detected accurately.

Notably, by providing the above-described first through fifth determination means, major anomalies of the temperature-sensitive element; i.e., wire-breakage (open), short-circuit, shift of the temperature characteristic to the high-temperature side or the low-temperature side, and invariance, can be detected, whereby the accuracy in detecting anomaly of temperature-sensitive element can be further enhanced. Further, since five modes of anomaly, i.e., wire-breakage (open), short-circuit, shift of the temperature characteristic to the high-temperature side, shift of the temperature characteristic to the low-temperature side, and invariance, can be determined, it becomes possible to comply with US emission standards US10 (Tier Bin 5).

Configuration 4. In the energization control apparatus for a controlled vehicle component according to any one of the above-described Configurations 1 to 3, when the sensitivity anomaly determination means detects an anomaly of the temperature-sensitive element associated with its sensitivity to a temperature to be measured, the supply of electric current to the controlled vehicle component is turned off.

According to the above-described Configuration 4, when an anomaly of the temperature-sensitive element is detected by the sensitivity anomaly determination means, the supply of electric current to the controlled vehicle component is turned off. Thus, it becomes possible to prevent application of an over current to the switching means, to thereby more reliably prevent overheating of the switching means and a malfunction caused by overheating.

Notably, when an anomaly of the temperature-sensitive element is detected, the supply of electric current to the controlled vehicle component may be turned off instantaneously. Alternatively, the supply of electric current to the controlled vehicle component may be turned off after elapse of a predetermined time. That is, in the case where a delay in switching off the electric current supply does not cause a failure of the controlled vehicle component such as wire-breakage, no limitation is imposed on the timing at which the supply of electric current is turned off. Notably, in the case where the controlled vehicle component is a glow plug, a specific example of the above-mentioned predetermined time is 30 sec for an effective voltage of 7.5 Vrms (an effective voltage applied to the glow plug determined such that the surface temperature of the heater of the glow plug saturates at a predetermined target value when an engine is stopped). However, the predetermined time can be freely selected in accordance with a controlled vehicle component to be used, the specifications of switching means to be used, the heat resistances of surrounding peripheral components, etc. In any case, the supply of electric current is turned off before a malfunction or failure occurs in the controlled vehicle component after the electric current supplied to the controlled vehicle component reaches a maximum value.

Configuration 5. An energization control method performed in an energization control apparatus for a controlled vehicle comprising: switching means disposed on a substrate and generating heat when supplying electric current from a power supply to a controlled vehicle component; a temperature-sensitive element disposed on the substrate; and sensitivity anomaly determination means for determining an anomaly of the temperature-sensitive element associated with sensitivity to a temperature to be measured, the method comprising: a temperature-difference calculation step of acquiring a first temperature based on a resistance of the temperature-sensitive element at a time before startup of a vehicle or within a fixed period after startup, acquiring a second temperature based on the resistance of the temperature-sensitive element after elapse of a predetermined wait time from the time of acquisition of the first temperature, and calculating the difference between the first and second temperatures; a first determination step of determining whether or not the difference is greater than a predetermined first threshold temperature; a second determination step of determining whether or not the difference is not greater than a predetermined second threshold temperature lower than the first threshold temperature and is greater than a predetermined third threshold temperature lower than the second threshold temperature; and a third determination step of determining whether or not the absolute value of the difference is not greater than the third threshold temperature.

Notably, the "first threshold temperature" is determined by use of a normal temperature-sensitive element. Specifically, the first threshold temperature is determined based on the maximum value of the resistance which can decrease in a period between a point in time before the controlled vehicle component generates heat and a point in time when the predetermined wait time has elapsed after the start of supply of electric current to the controlled vehicle component. Further, the "second threshold temperature" is determined by use of a normal temperature-sensitive element. Specifically, the second threshold temperature is determined based on the minimum value of the resistance which can decrease between a point in time before the controlled vehicle component generates heat and a point in time when the predetermined wait time has elapsed after the start of supply of electric current to the controlled vehicle component. In addition, the "third threshold temperature" is a temperature between 0° C. and the second threshold temperature. The third threshold temperature can be set based on a variation in the resistance of a normal temperature-sensitive element, which variation occurs when the normal temperature-sensitive element is placed in an environment whose temperature is constant.

According to Configuration 5, by the first determination step, the second determination step, and the third determination step, various modes of anomaly; i.e., high-temperature-side-shift anomaly, low-temperature-side-shift anomaly, and invariance anomaly, can be determined accurately, whereby an anomaly of the temperature-sensitive element can be accurately detected.

Configuration 6. The energization control method according to the above-described Configuration 5, further comprising: a fourth determination step of determining whether or not an output value based on the resistance of the temperature-sensitive element is greater than a predetermined maximum allowable value; and a fifth determination step of determining whether or not the output value based on the resistance of the temperature-sensitive element is smaller than a predetermined minimum allowable value.

According to Configuration 6, by the fourth determination step and the fifth determination step, a wire-breakage failure, an open failure, and a short-circuit failure of the temperature-sensitive element can be accurately detected.

Configuration 7. In the energization control method according to the above-described Configuration 5 or 6, when at least one of the determination conditions of the determination steps is satisfied, the supply of electric current to the controlled vehicle component is turned off.

According to Configuration 7, basically, an action and effect similar to those provided by the above-described Configuration 4 are obtained.

Configuration 8. A heat generation system comprising: an energization control apparatus for a controlled vehicle component according to any one of the above-described Configurations 1 to 4; and a controlled vehicle component controlled by the energization control apparatus.

As set forth in Configuration 8, the above-described technical idea may be embodied in a heat generation system including a controlled vehicle component. In this case, basically, an action and effect similar to those provided by Configuration 1 are obtained.

DESCRIPTION OF REFERENCE NUMERALS

Figure 1A:
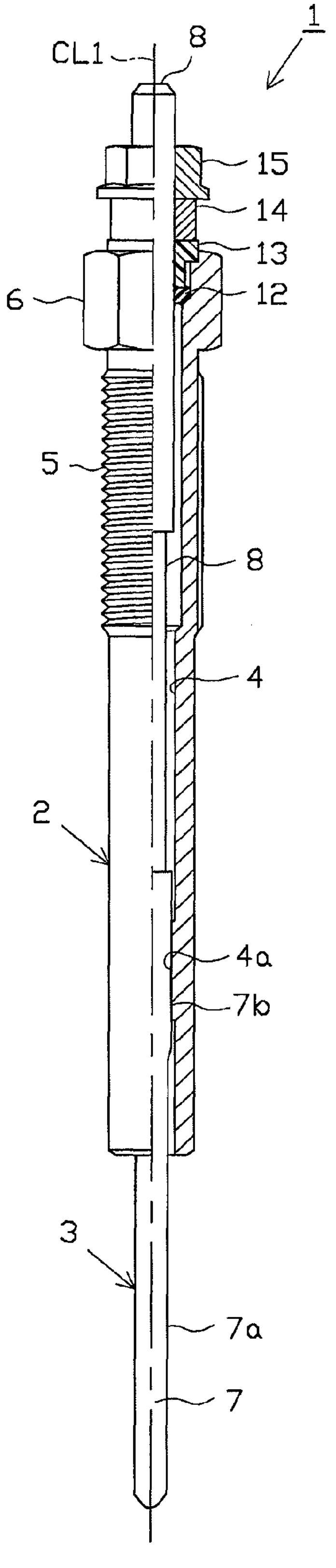
FIG. 1A is a partially sectioned front view of a glow plug according to an embodiment.

Reference numerals used to identify various features in the drawings include the following.

- 1: glow plug (controlled vehicle component)
- 30: energization control apparatus
- 32: FET
- 34: thermistor (temperature-sensitive element)
- 36: anomaly detection means
- 41: sensitivity anomaly determination means
- 43: wire-breakage determination means (fourth determination means)
- 44: short-circuit determination means (fifth determination means)
- 45: temperature-difference calculation means
- 46: high-temperature-side-shift determination mean (first determination means)
- 47: low-temperature-side-shift determination means (second determination means)
- 48: resistance-invariance determination means (third determination means)

DETAILED DESCRIPTION OF THE PREFERRED EMBODIMENTS

An embodiment of the invention will now be described with reference to the drawings. However, the present invention should not be construed as being limited thereto.

First, the structure of a glow plug 1 (controlled vehicle component) will be described, the energizing of which is controlled by means of an energization control apparatus 30 for a controlled vehicle component according to the present invention. FIG. 1A is a partially sectioned front view of an example of a glow plug having a sheath heater; and FIG. 1B is a sectional view of a front end portion of the glow plug.

Figure 1B:
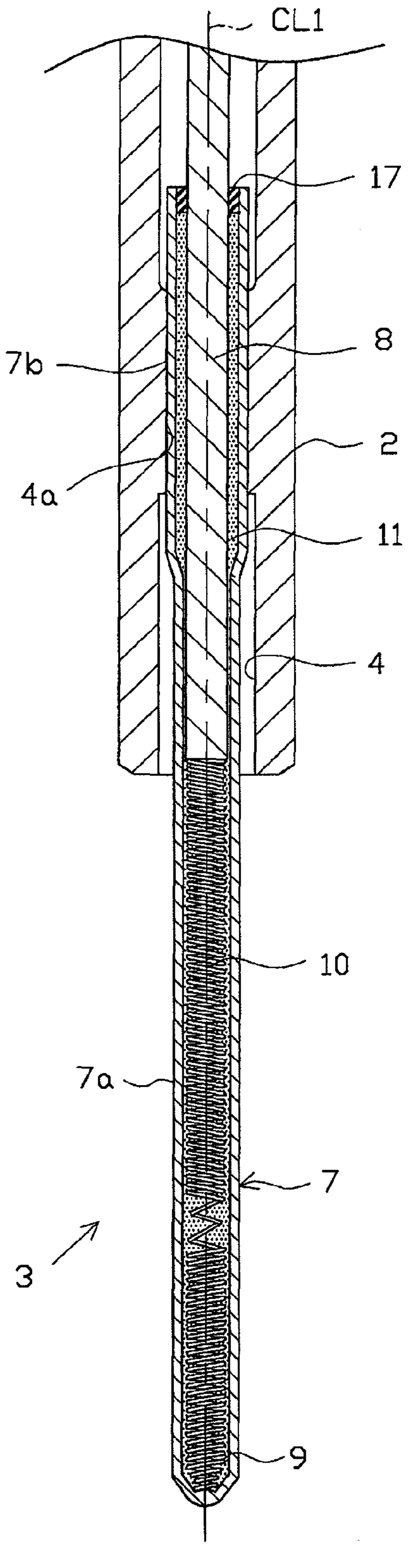
FIG. 1B is a partial enlarged sectional view of a front end portion of the glow plug.

As shown in FIGS. 1A and 1B, the glow plug 1 includes a tubular metallic shell 2, and a sheath heater 3 attached to the metallic shell 2.

The metallic shell 2 has an axial hole 4 extending in the direction of an axis CL1, and also has a screw portion 5 and a tool engagement portion 6 formed on an outer circumferential surface thereof. The screw portion 5 is used to mount the glow plug 1 onto a diesel engine. The tool engagement portion 6 has a hexagonal cross section, and a tool such as a torque wrench is engaged with the tool engagement portion 6.

The sheath heater 3 includes a tube 7 and a center rod 8 which are united in the direction of the axis CL1.

The tube 7 is a cylindrical tube which contains iron (Fe) or nickel (Ni) as a main component and which has a closed front end portion. At the rear end of the tube 7, an annular rubber member 17 is provided between the tube 7 and the center rod 8 in order to seal the rear end.

In addition, a heat generation coil 9 and a control coil 10 are enclosed within the tube 7 along with an insulating powder 11 such as magnesium oxide (MgO) powder. The heat generation coil 9 is joined to the front end of the tube 7, and the control coil 10 is connected in series to the rear end of the heat generation coil 9. Although the heat generation coil 9 is electrically connected, at its front end, to the tube 7, the outer circumferences of the heat generation coil 9 and the control coil 10 are electrically isolated from the inner circumferential surface of the tube 7 by means of the insulating powder 11 present therebetween.

The heat generation coil 9 is formed from a resistance heating wire made of, for example, an Fe-chromium (Cr)-aluminum (Al) alloy. Meanwhile, the control coil 10 is formed from a resistance heating wire of a material which is larger than the material of the heat generation coil 9 in terms of the temperature coefficient of electrical resistivity. For example, the control coil 10 is formed from a resistance heating wire of a material containing Co or Ni as a main component, such as a cobalt (Co)—Ni—Fe alloy. Thus, the control coil 10 increases in electric resistance upon generation of heat by its own self and receipt of heat from the heat generation coil 9, to thereby restrain the amount of electric power supplied to the heat generation coil 9. Accordingly, at the beginning of energization, a relatively large amount of electric power is supplied to the heat generation coil 9, whereby the temperature of the heat generation coil 9 increases rapidly. As a result of heat generated by the heat generation coil 9, the control coil 10 is heated, and its electric resistance increases, whereby the amount of electric power supplied to the heat generation coil 9 decreases. By virtue of the function of the control coil 10, the sheath heater 3 has a temperature rising characteristic such that, after a quick increase at the beginning of energization, the temperature saturates because the control coil 10 restricts the supply of electric power to the heat generation coil 9. That is, due to presence of the control coil 10, it becomes possible to prevent excessive increase (overshoot) of the temperature of the heat generation coil 9 while enhancing the quick temperature rising property.

The tube 7 is formed by swaging or the like such that a small diameter portion 7*a* for accommodating the heat generation coil 9, etc., is formed at the front end side, and a large diameter portion 7*b*, which is larger in diameter than the small diameter portion 7*a*, is formed on the rear end side thereof. The large diameter portion 7*b* is press-fitted into and joined to a small diameter portion 4*a* of the axial hole 4 of the metallic shell 2, whereby the tube 7 is held in a state where the tube 7 projects from the front end of the metallic shell 2.

The front end of the center rod 8 is inserted into the tube 7, and is electrically connected to the rear end of the control coil 10. The center rod 8 is passed through the axial hole 4 of the metallic shell 2, and the rear end of the center rod 8 projects from the rear end of the metallic shell 2. At the rear end portion of the metallic shell 2, an O-ring 12 formed of rubber or the like, an insulating bushing 13 formed of resin or the like, a holding ring 14 for preventing the insulating bushing 13 from coming off, and a nut 15 for connection of an electric supply cable are fitted onto the center rod 8 in this sequence from the front end side.

Next, the energization control apparatus 30 for the controlled vehicle component, which is a feature of the present invention, will be described.

Figure 2:
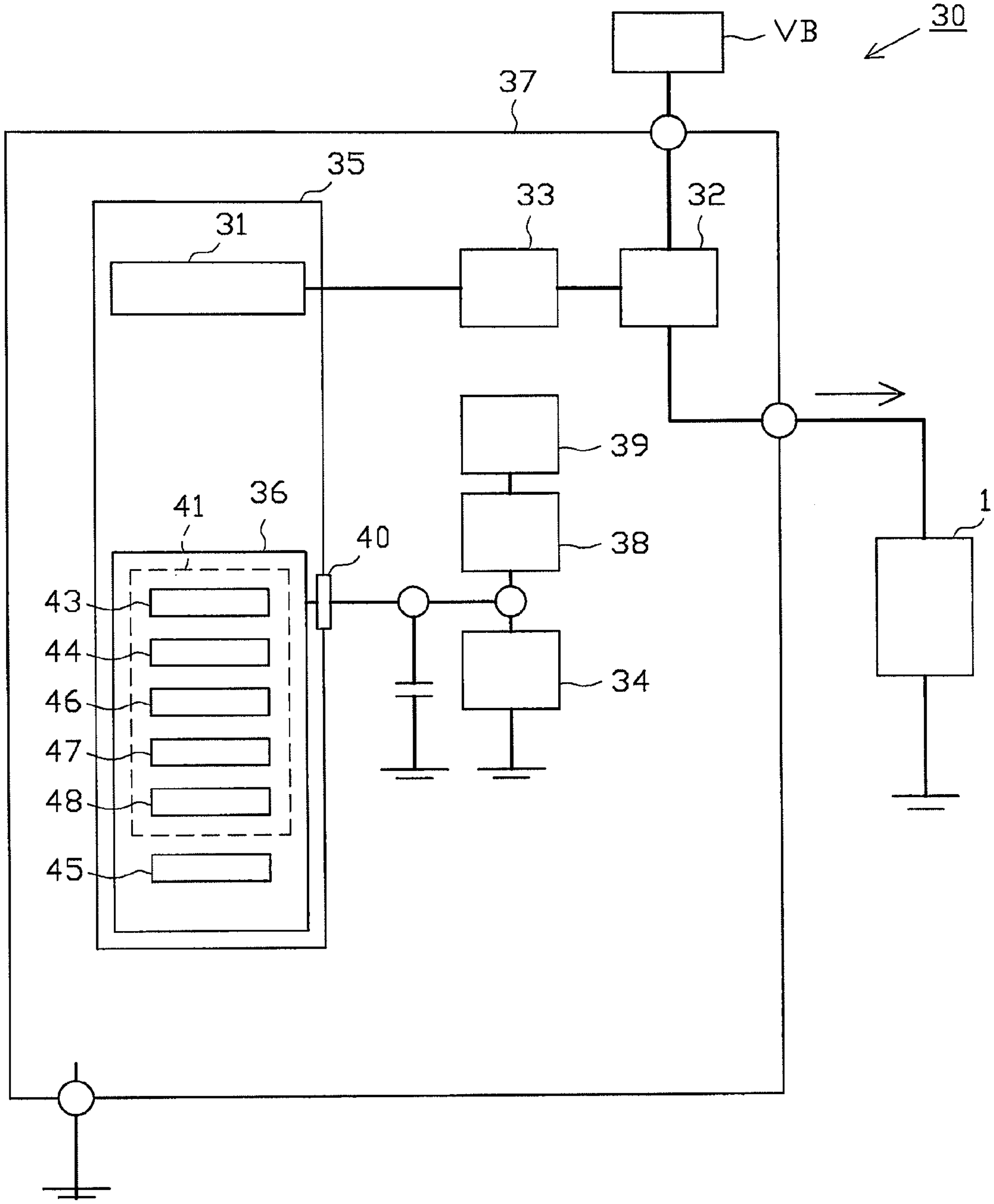
FIG. 2 is a block diagram showing the configuration of an energization control apparatus.

As shown in FIG. 2, the energization control apparatus 30 includes energization signal output means 31; an FET (field effect transistor) 32 and an FET driver 33, which constitute switching means; a thermistor 34, which serves as a temperature-sensitive element; an ECU 35 including a CPU; and anomaly detection means 36. Although the FET 32, the FET driver 33, the thermistor 34 and the ECU 35 are disposed on a substrate 37, the thermistor 34 is disposed at a position relatively remote from the FET 32.

The energization signal output means 31 is controlled by the ECU 35, and outputs to the FET driver 33 a PWM signal which represents timings at which electric current is supplied to the glow plug 1 from a power supply (battery) VB having a predetermined output voltage (e.g., 12 V). Operation of the energization signal output means 31 will be described in detail. When electric current is to be supplied from the power supply VB to the glow plug 1, the energization signal output means 31 outputs a High signal to the FET driver 33 as a PWM signal. Meanwhile, when the supply of electric current from the power supply VB to the glow plug 1 is to be switched off, the energization signal output means 31 outputs a Low signal to the FET driver 33 as a PWM signal. Notably, for temperature control of the sheath heater 3, a so-called PWM (Pulse-Width-Modulation) control is carried out in which the amount of electric current supplied to the glow plug 1 is controlled by changing the width of the High signal in each cycle.

The source of the FET 32 is connected to the power supply VB, and the drain of the FET 32 is connected to the glow plug 1. Further, the gate of the FET 32 is connected to the above-mentioned FET driver 33. When the voltage applied to the gate becomes equal to or less than a predetermined value, an electric current supply path (i.e., a conductive channel) between the source and the drain is opened, whereby supply of electric current to the glow plug 1 begins.

The FET driver 33 is composed of a transistor and a plurality of predetermined resistors (none of which is shown), and is adapted to open and close the electric current supply path of the FET 32 in accordance with the PWM signal supplied from the energization signal output means 31. That is, when a High signal is supplied as the PWM signal, the voltage applied to the gate of the FET 32 becomes equal to or less than the predetermined value, whereby the electric current supply path (conductive channel) of the FET 32 is opened. Meanwhile, when a Low signal is supplied as the PWM signal, the voltage applied to the gate of the FET 32 becomes greater than the predetermined value, whereby the electric current supply path of the FET 32 is closed. Depending on the type of FET that is employed, the voltage applied to the gate that is needed to turn the FET on and off may be reversed, for example.

The thermistor 34 is an NTC (negative temperature coefficient) thermistor. One end of the thermistor 34 is connected via a resistor 38 to a power supply 39 having a predetermined output voltage (e.g., 5 V), and the other end of the thermistor 34 is connected to ground. Further, a node between the thermistor 34 and a resistor 38 is connected to the ECU 35, whereby a voltage produced as a result of voltage division in accordance with the resistance of the thermistor 34 is supplied to the ECU 35 via an A/D converter 40 having a resolution of 10 bits. The A/D converter 40 converts the voltage supplied from the thermistor 34 side to a digital value representing the voltage quantized in accordance with a previously set range of input voltage. Here, the case where the range of input voltage is 0 V to 5 V is considered. In such a case, when 5 V is input from the thermistor 34 side, the A/D converter 40 converts the voltage from the thermistor 34 side to $2^{10}-1$ (=1023) LSB (least significant bit), and, when 0 V is input from the thermistor 34 side, the A/D converter 40 converts the voltage from the thermistor 34 side to $2^{0}-1$ (=0) LSB.

The anomaly detection means 36 is controlled by the ECU 35, and includes sensitivity anomaly determination means 41.

The sensitivity anomaly determination means 41 includes wire-breakage determination means 43, which serves as the fourth determination means, and short-circuit determination means 44, which serves as the fifth determination means.

The wire-breakage determination means 43 determines whether or not the numerical value input to the ECU 35 through conversion by the A/D converter 40 is greater than a previously set maximum allowable value [e.g., 1020 (LSB)]. More specifically, after an internal combustion engine to which the glow plug 1 is mounted is started, the wire-breakage determination means 43 checks, at predetermined intervals, the numerical value input from the A/D converter 40. When the numerical value exceeds the maximum allowable value, the wire-breakage determination means 43 transmits to the ECU 35 a signal indicating that an anomaly has been detected. Notably, when such a signal is transmitted to the ECU 35, the ECU 35 increments the numerical value of a wire-breakage detection counter by one, which value has been initially set to zero. When the numerical value of the wire-breakage detection counter becomes equal to or greater than a previously set value (hereinafter referred to as the "threshold for wire breakage detection"), the ECU 35 determines that the thermistor 34 has a wire-breakage failure or open failure.

The short-circuit determination means 44 determines whether or not the numerical value input to the ECU 35 through conversion by the A/D converter 40 is less than a previously set minimum allowable value [e.g., 10 (LSB)]. Specifically, the short-circuit determination means 44 checks the numerical value input from the A/D converter 40, in synch with checking by the wire-breakage determination means 43. When the numerical value is less than the minimum allowable value, the short-circuit determination means 44 transmits to the ECU 35 a signal indicating that an anomaly has been detected. Notably, when such a signal is transmitted to the ECU 35, the ECU 35 increments the numerical value of a short-circuit detection counter by one, which value has been initially set to zero. When the numerical value of the short-circuit detection counter becomes equal to or greater than a previously set value (hereinafter referred to as the "threshold for short circuit detection"), the ECU 35 determines that the thermistor 34 has a short-circuit failure. Further, when the numerical value input from the A/D converter 40 is not greater than the maximum allowable value and not less than the minimum allowable value, the ECU 35 decrements each of the numerical value of the wire-breakage detection counter and the numerical value of the short-circuit-detection counter by one at a time until the numerical value becomes zero.

Further, the anomaly detection means 36 includes temperature-difference calculation means 45; and the sensitivity anomaly determination means 41 includes high-temperature-side-shift determination means 46, which serves as the first determination means; low-temperature-side-shift determination means 47, which serves as the second determination means; and resistance-invariance determination means 48, which serves as the third determination means.

The temperature-difference calculation means 45 acquires a first temperature T1 (a first physical quantity) based on the voltage of the thermistor 34 input via the A/D converter 40 at a timing before startup of the vehicle or within a fixed period from the startup (for example, at the time of initial startup of the internal combustion engine; notably, the term "initial startup" refers to startup from a state in which the internal combustion engine has not been operated continuously over a predetermined period of time). Further, the temperature-difference calculation means 45 acquires a second temperature T2 (a second physical quantity) based on the voltage of the thermistor 34 when a predetermined wait time (e.g., 60 seconds) has elapsed from the point in time at which the first temperature T1 was acquired. In addition, the temperature-difference calculation means 45 calculates a temperature difference $\Delta T$ by subtracting the first temperature T1 from the second temperature T2.

Figure 3:
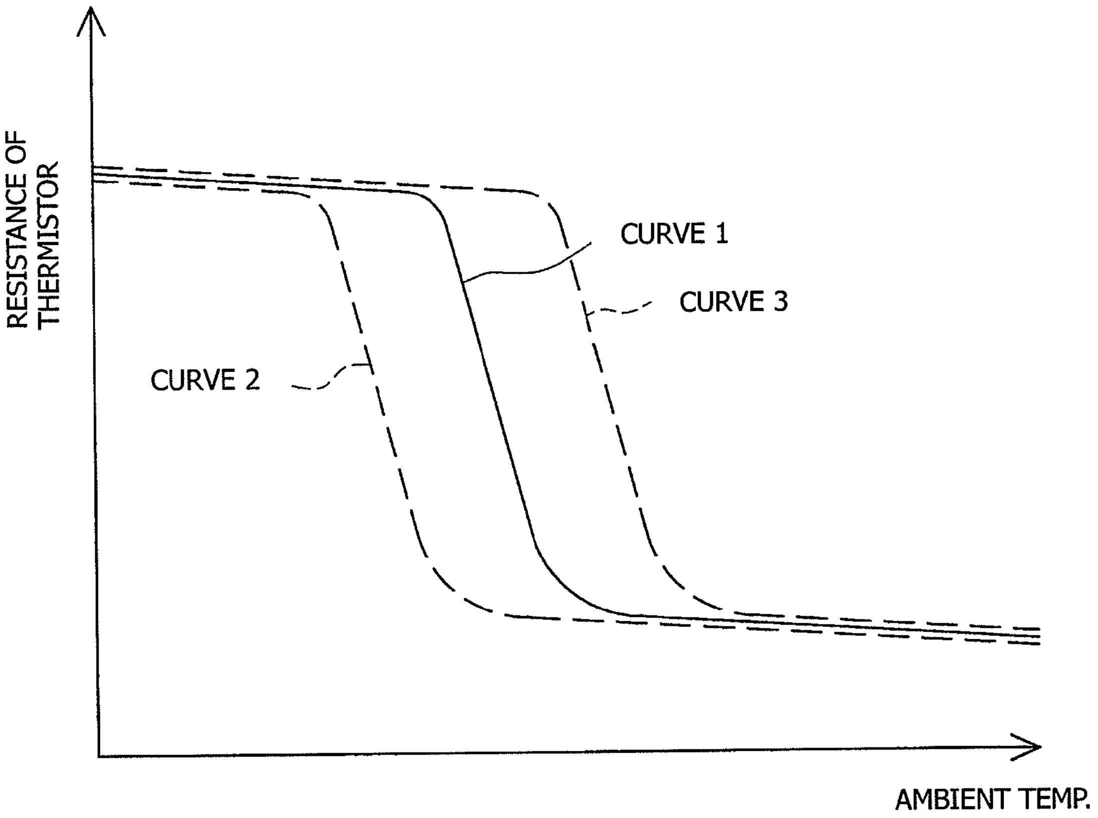
FIG. 3 is a graph illustrating changes in the temperature characteristics of a thermistor.
Figure 4A:
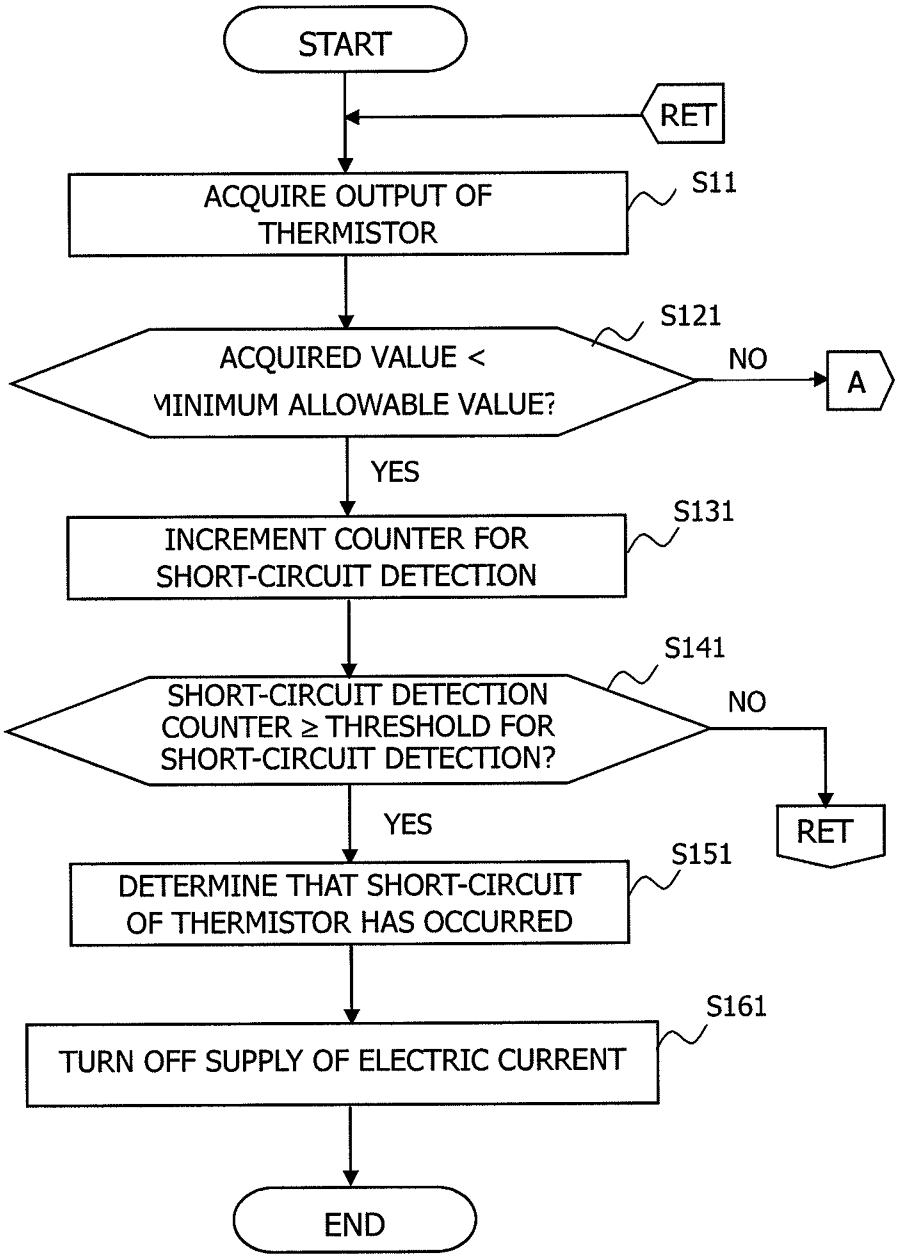
FIGS. 4A and 4B are flowcharts illustrating a method of detecting wire-breakage and short-circuit of a thermistor performed by short-circuit detection means, etc.
Figure 4B:
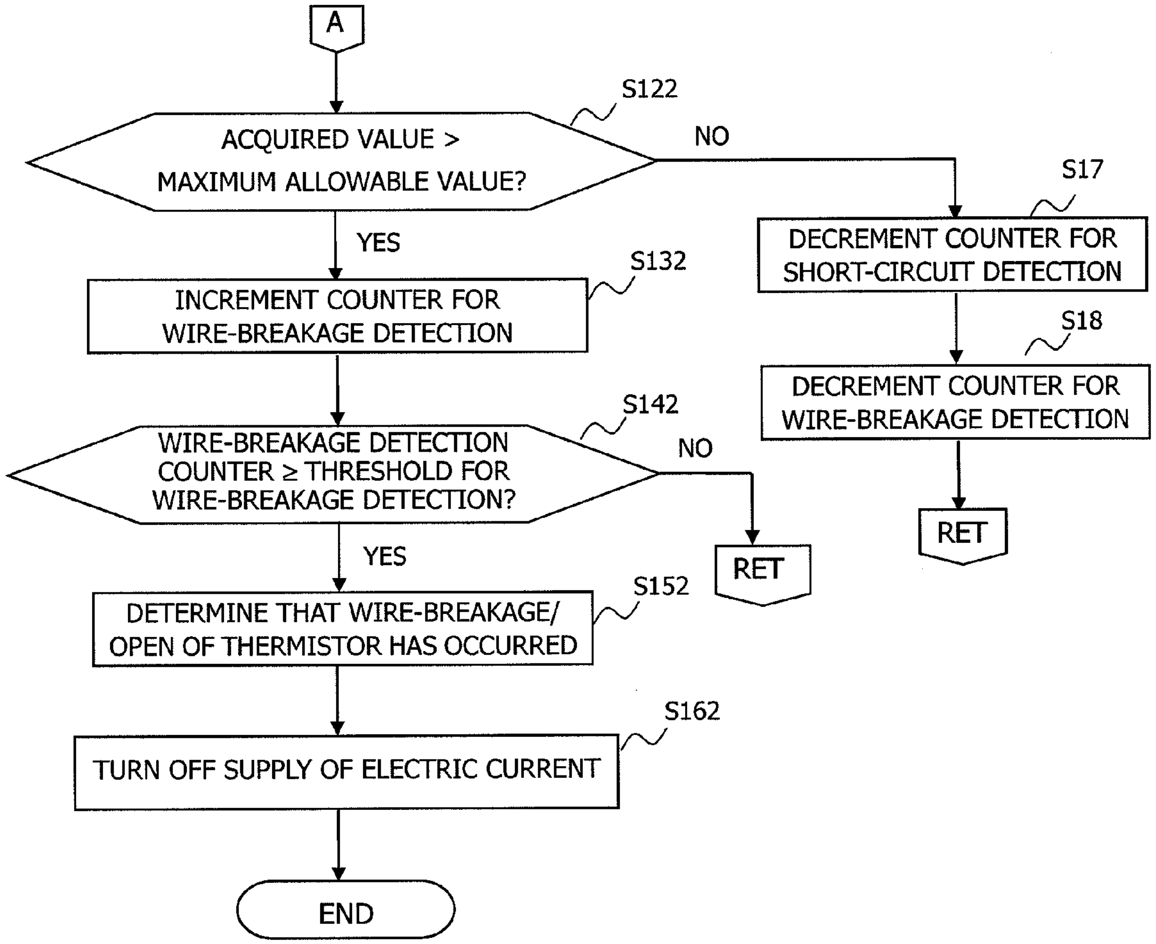

The high-temperature-side-shift determination means 46 determines whether or not the temperature difference 66 T is greater than a previously set, predetermined first threshold temperature (corresponding to the "first threshold" in the present invention) TS1 (e.g., 24° C.). When the temperature difference $\Delta T$ is greater than the first threshold temperature TS1, the high-temperature-side-shift determination means 46 transmits to the ECU 35 a signal indicating that an anomaly has been detected. Upon receipt of the signal, the ECU 35 determines that an anomaly has occurred with the thermistor 34; specifically, that the temperature characteristic of the thermistor 34 has shifted to the high-temperature side from the normal temperature characteristic of the thermistor 34. Notably, the "anomaly of shifting of the temperature characteristic to the high-temperature side" refers to an anomalous state in which the thermistor 34 indicates a temperature higher than that indicated by the thermistor 34 when it is normal. That is, it refers to an anomalous state in which the relation between the ambient temperature and resistance of the thermistor 34, which is observed when the thermistor 34 is normal and which is indicated by curve 1 of FIG. 3, has shifted toward the lower ambient temperature side as indicated by curve 2 of FIG. 3.

The low-temperature-side-shift determination means 47 determines whether or not the temperature difference $\Delta T$ is not greater than a previously set, predetermined second threshold temperature (corresponding to the "second threshold" in the present invention) TS2 (e.g., 4° C.) and is greater than a previously set, predetermined positive third threshold temperature (corresponding to the "third threshold" in the present invention) TS3 (e.g., 2° C.), or the temperature difference $\Delta T$ is smaller than a numerical value (e.g., −2° C.) obtained by inverting the sign of the third threshold temperature TS3. When the temperature difference $\Delta T$ is not greater than the second threshold temperature TS2 and is greater than the third threshold temperature TS3, or the temperature difference $\Delta T$ is smaller than the numerical value obtained by inverting the sign of the third threshold temperature TS3, the low-temperature-side-shift determination means 47 transmits to the ECU 35 a signal indicating that an anomaly has been detected. Upon receipt of the signal, the ECU 35 determines that an anomaly has occurred with the thermistor 34; specifically, that the temperature characteristic of the thermistor 34 has shifted to the low-temperature side from the normal temperature characteristic of the thermistor 34. Notably, a value smaller than the first threshold temperature TS1 is set as the second threshold temperature TS2, and a positive value smaller than the second threshold temperature TS2 is set as the third threshold temperature TS3. Notably, the "anomaly of shifting of the temperature characteristic to the low-temperature side" refers to an anomalous state in which the thermistor 34 indicates a temperature lower than that indicated by the thermistor 34 when it is normal. That is, it refers to an anomalous state in which the relation between the ambient temperature and resistance of the thermistor 34, which is observed when the thermistor 34 is normal and which is indicated by curve 1 of FIG. 3, has shifted toward the higher ambient temperature side as indicated by curve 3 of FIG. 3.

The resistance-invariance determination means 48 determines whether or not the absolute value of the temperature difference $\Delta T$ is equal to or less than the third threshold temperature TS3; i.e., whether or not the first temperature T1 and the second temperature T2 are approximately equal to each other. When the absolute value of the temperature difference $\Delta T$ is equal to or less than third threshold temperature TS3, the resistance-invariance determination means 48 transmits to the ECU 35 a signal indicating that an anomaly has been detected. Upon receipt of the signal, the ECU 35 determines that an anomaly has occurred with the thermistor 34; specifically, that its resistance hardly changes irrespective of a change in the ambient temperature (also referred to herein as a "stuck" or invariance anomaly).

Notably, the third threshold temperature TS3 is determined based on the amount of change in the resistance of the thermistor 34 input as voltage via the A/D converter 40, under the condition that the ambient temperature does not change. Specifically, when the A/D converter 40 quantizes the input voltage, a variation of about 1 to 3 LSB (reading unit) occurs because of fluctuation of a reference voltage, etc. Since this variation in the read value corresponds to a variation of about 1° C., in the present embodiment, the third threshold temperature TS3 is set to 2° C. (a value obtained by adding a margin to the variation of about 1° C.).

The ECU 35 is configured to change the PWM signal output from the energization signal output means 31 from the High signal to the Low signal when information indicating an anomaly of the thermistor 34 is transmitted from one of the wire-breakage determination means 43, the short-circuit determination means 44, the high-temperature-side-shift determination means 46, the low-temperature-side-shift determination means 47, and the resistance-invariance determination means 48. That is, the ECU 35 turns off the supply of electric current from the power supply VB to the glow plug 1 when the thermistor 34 is determined to have suffered an anomaly.

Next, a method of anomaly detection by the above-described anomaly detection means 36 will be described with reference to the flowcharts of FIGS. 4A, 4B, 5A and 5B. First, a method of anomaly detection by the wire-breakage determination means 43 and the short-circuit determination means 44 will be described with reference to FIGS. 4A and 4B.

First, in step S11, the numerical value obtained, through conversion by the A/D converter 40, from the output (voltage) from the thermistor 34 is acquired (read). Subsequently, in step S121, a determination is made as to whether or not the acquired value is less than a minimum allowable value (in the present embodiment, 10 LSB). When the acquired numerical value is less than the minimum allowable value, processing proceeds to step S131. When the acquired numerical value is equal to or greater than the minimum allowable value, processing proceeds to step S122. For example, processing proceeds to step S131 when the acquired numerical value is 5 LSB, and to step S122 when the acquired numerical value is 500 LSB.

In step S131, the numerical value of the short-circuit-detection counter is incremented by 1, and in step S141, a determination is made as to whether or not the numerical value of the short-circuit-detection counter is equal to or greater than the above-mentioned threshold for short circuit detection. In the case where the numerical value of the short-circuit-detection counter is equal to or greater than the threshold for short circuit detection, processing proceeds to step S151, in which the thermistor 34 is determined to have a short-circuit failure. Subsequently, processing proceeds to step S161 so as to stop the supply of electricity to the glow plug 1. In the case where the numerical value of the short-circuit-detection counter is less than the threshold for short circuit detection, processing returns to step S11.

In step S122, a determination is made as to whether or not the acquired numerical value is greater than the maximum allowable value (in the present embodiment, 1020 LSB). In the case where the acquired numerical value is greater than the maximum allowable value, processing proceeds to step S132. In the case where the acquired numerical value is equal to or less than the maximum allowable value, processing proceeds to step S17. For example, processing proceeds to step S132 when the numerical value acquired from the voltage from the thermistor 34 side is 1023 LSB, and to step S17 when the acquired numerical value is 500 LSB.

In step S132, the numerical value of the wire-breakage detection counter is incremented by one, and, in step S142, a determination is made as to whether or not the numerical value of the wire-breakage detection counter is equal to or greater than the above-mentioned threshold for wire breakage detection. In the case where the numerical value of the wire-breakage detection counter is equal to or greater than the threshold for wire breakage detection, processing proceeds to step S152, in which the thermistor 34 is determined to have a wire-breakage or open failure. Subsequently, processing proceeds to step S162 so as to stop the supply of electricity to the glow plug 1. In the case where the numerical value of the wire-breakage detection counter is less than the threshold for wire breakage detection, processing returns to S11.

In the case where the numerical value acquired from the thermistor 34 side is not less than the minimum allowable value and not greater than the maximum allowable value, the thermistor 34 is said to not suffer a failure such as a short-circuit, wire-breakage, or the like. Accordingly, in step S17 to which processing proceeds when the acquired numerical value is not less than the minimum allowable value and not greater than the maximum allowable value, the numerical value of the short-circuit-detection counter is decremented by one. Further, in step S18, the numerical value of the wire-breakage detection counter is decremented by one.

After that, except for the case where the supply of electric current to the glow plug 1 is turned off in step S161 or S162, or in step S29 described below, the above-described anomaly determination by the wire-breakage determination means 43 and the short-circuit determination means 44 is performed basically at predetermined intervals.

Figure 5A:
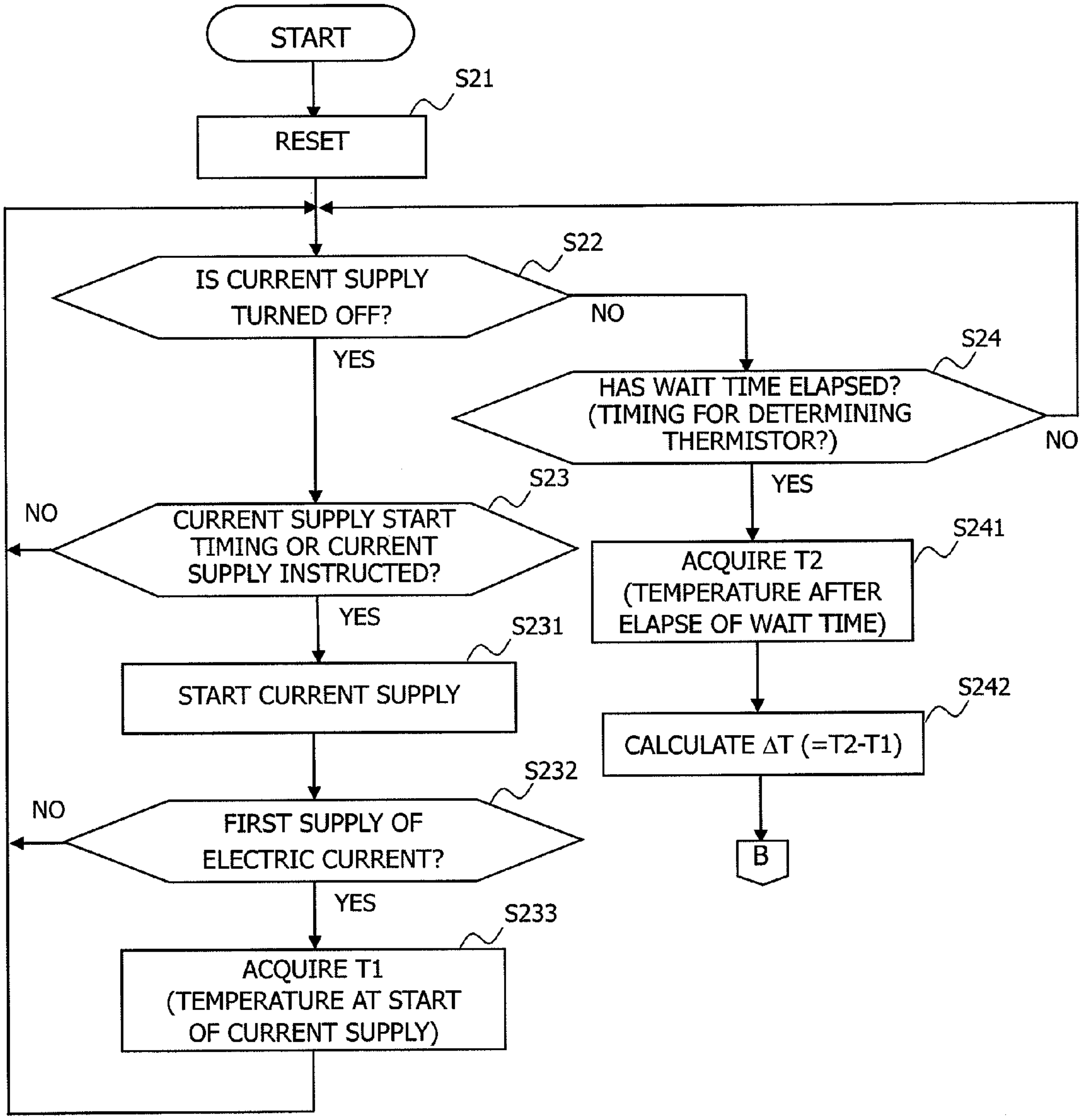
FIGS. 5A and 5B are flowcharts illustrating a method of detecting a high-temperature-side-shift anomaly, etc., of the thermistor performed by high-temperature-side-shift determination means, etc.
Figure 5B:
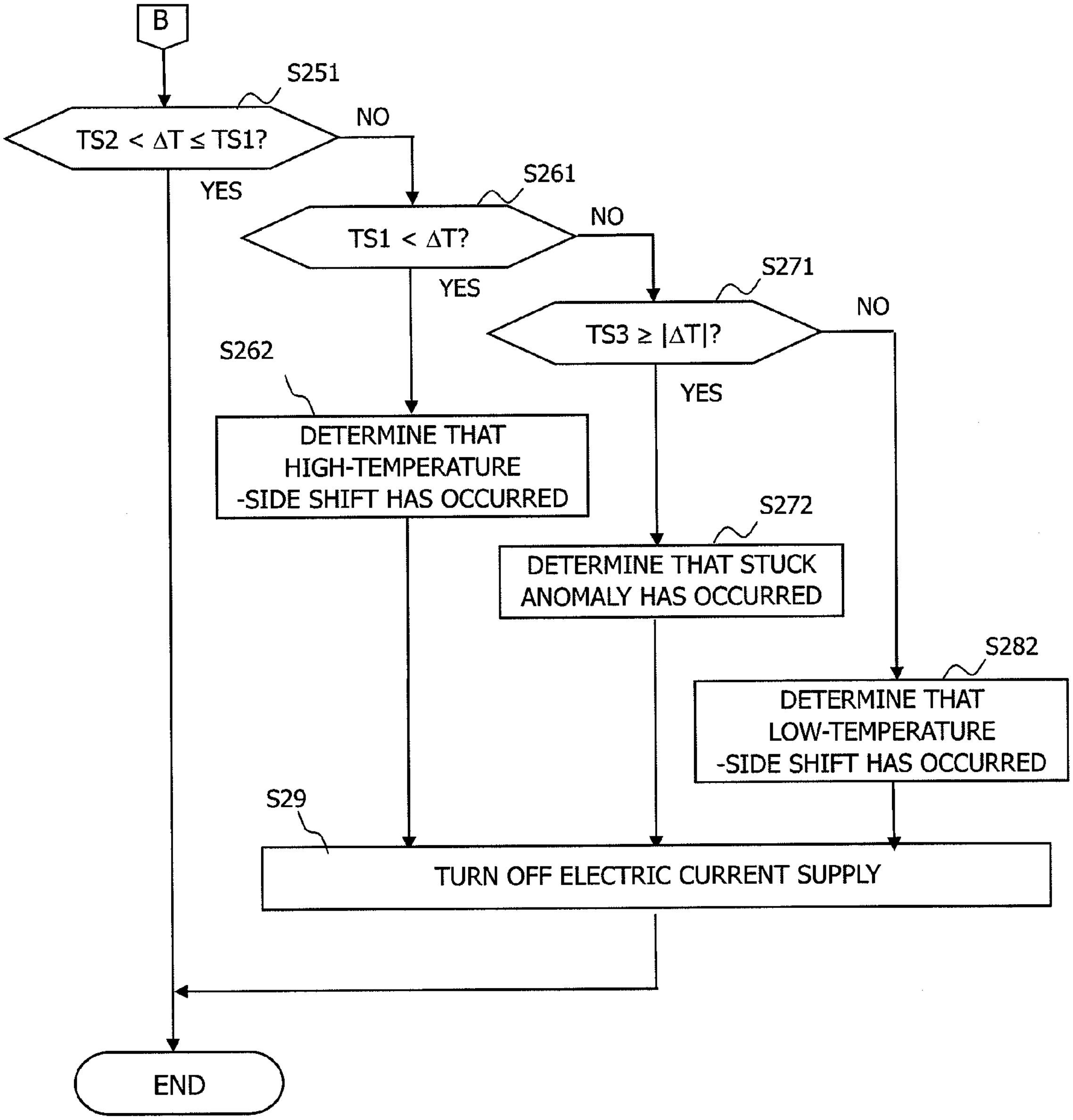

Next, a method of anomaly detection by the above-described determination means 46 to 48 will be described with reference to the flowcharts of FIGS. 5A and 5B.

First, in step S21, the acquired and calculated numerical values, such as the first temperature T1 and the second temperature T2, are reset to respective initial values. Next, in step S22, a determination is made as to whether or not the supply of electric current to the glow plug 1 is turned off. In the case where the supply of electric current to the glow plug 1 is turned off, processing proceeds to step S23. In the case where electric current is being supplied to the glow plug 1, processing proceeds to step S24.

In step S23, a determination is made as to whether or not a timing for starting the supply of electric current to the glow plug 1 has come or an instruction for starting the supply of electric current is present. In the case where the timing for starting the supply of electric current has come or the instruction for starting the supply of electric current is present, processing proceeds to step S231. In the case where the timing for starting the supply of electric current has not yet come and the instruction for starting the supply of electric current is not present, processing returns to step S22.

In step S231, the supply of electric current to the glow plug 1 is started. In step S232 subsequent thereto, a determination is made as to whether or not the supply of electric current to the glow plug 1 in step S231 is the first supply of electric current (the first supply of electric current after the supply of electric current is continuously turned off for a predetermined period of time or longer). In the case where the supply of electric current to the glow plug 1 in step S231 is the first supply of electric current, processing proceeds to step S233 so as to acquire the first temperature T1 based on the resistance of the thermistor 34. In the case where the supply of electric current to the glow plug 1 in step S231 is the second or subsequent supply of electric current, processing returns to step S22.

In step S24, a determination is made as to whether or not the above-mentioned wait time has elapsed after the point in time at which the first temperature T1 has been acquired; i.e., whether or not a timing for determining the presence/absence of anomaly of the thermistor 34 has come. In the case where the wait time has elapsed after the point in time at which the first temperature T1 has been acquired, processing proceeds to step S241. In the case where the wait time has not yet elapsed, processing returns to step S22.

In step S241, the second temperature T2 based on the resistance of the thermistor 34 is acquired. Subsequently, in step S242 (corresponding to the temperature-difference calculation step), the temperature difference ΔT is calculated by subtracting the first temperature T1 from the acquired second temperature T2.

Subsequently, in step S251, a determination is made as to whether or not the temperature difference ΔT is greater than the second threshold temperature TS2 and not greater than the first threshold temperature TS1. In the case where the temperature difference ΔT is greater than the second threshold temperature TS2 and not greater than the first threshold temperature TS1, the thermistor 34 is considered to have a normal temperature characteristic, and the anomaly determination is ended. Meanwhile, in the case where the temperature difference ΔT is equal to or less than the second threshold temperature TS2 or the temperature difference ΔT is greater than the first threshold temperature TS1, the thermistor 34 is considered to have an anomalous temperature characteristic. In such a case, in order to determine the anomaly mode, step S261 and steps subsequent thereto are executed.

That is, in step S261 (corresponding to the first determination step), a determination is made as to whether or not the temperature difference ΔT is greater than the first threshold temperature TS1. In the case where the temperature difference ΔT is greater than the first threshold temperature TS1, information indicating detection of an anomaly is transmitted to the ECU 35. In step S262, the ECU 35 determines that the thermistor 34 has a high-temperature-side-shift anomaly. Next, in step S29, the supply of electric current to the glow plug 1 is turned off, and the anomaly determination is ended. Meanwhile, in the case where the temperature difference ΔT is not greater than the first threshold temperature TS1, processing proceeds from step S261 to step S271.

In step S271 (corresponding to the third determination step), a determination is made as to whether or not the absolute value of the temperature difference ΔT is equal to or less than the third threshold temperature TS3. In the case where the absolute value of the temperature difference ΔT is equal to or less than the third threshold temperature TS3, information indicating detection of an anomaly is transmitted to the ECU 35. Subsequently, in step S272, the ECU 35 determines that the thermistor 34 has a stuck anomaly. After that, in step S29, the supply of electric current to the glow plug 1 is turned off, and the anomaly determination is ended.

Further, in the case where the conditions of step S251, S261, and S271 are not satisfied; that is, in the case where the temperature difference ΔT is greater than the third threshold temperature TS3 and not greater than the second threshold temperature TS2, or the temperature difference ΔT is lower than the temperature obtained by inverting the sign of the third threshold temperature TS3, processing proceeds to step S282. In step S282, the temperature characteristic of the thermistor 34 is determined to have shifted to the low-temperature side. Subsequently, in step S29, the ECU 35 turns off the supply of electric current to the glow plug 1, and ends the anomaly determination. Notably, in the present embodiment, a stage composed of steps S251, S261 and S271 corresponds to the second determination step.

As described above, according to the present embodiment, the above-described determination means 43, 44, 46, 47 and 48 can determine various modes of anomaly of the thermistor 34, such as wire-breakage (open failure), short-circuit, high-temperature-side-shift anomaly, low-temperature-side-shift anomaly, and stuck (invariance) anomaly, whereby an anomaly of the thermistor 34 can be accurately detected.

Further, anomaly determination can be performed by monitoring the voltage or the like based on the resistance of the single thermistor 34, without requiring a plurality of thermistors. Therefore, production costs are lowered. Further, in the energization control apparatus 30 according to the present invention which includes the single thermistor 34, an erroneous determination which would otherwise occur when a plurality of thermistors are provided; i.e., which would otherwise occur due to difference in the positional relation between each thermistor and the FET, does not occur. Therefore, accuracy in detecting an anomaly of the thermistor 34 can be further improved.

Notably, the present invention is not limited to the specifics and details of the above-described embodiment, and may be practiced as follows. Needless to say, other applications and modifications not illustrated below may also be made.

Figure 6:
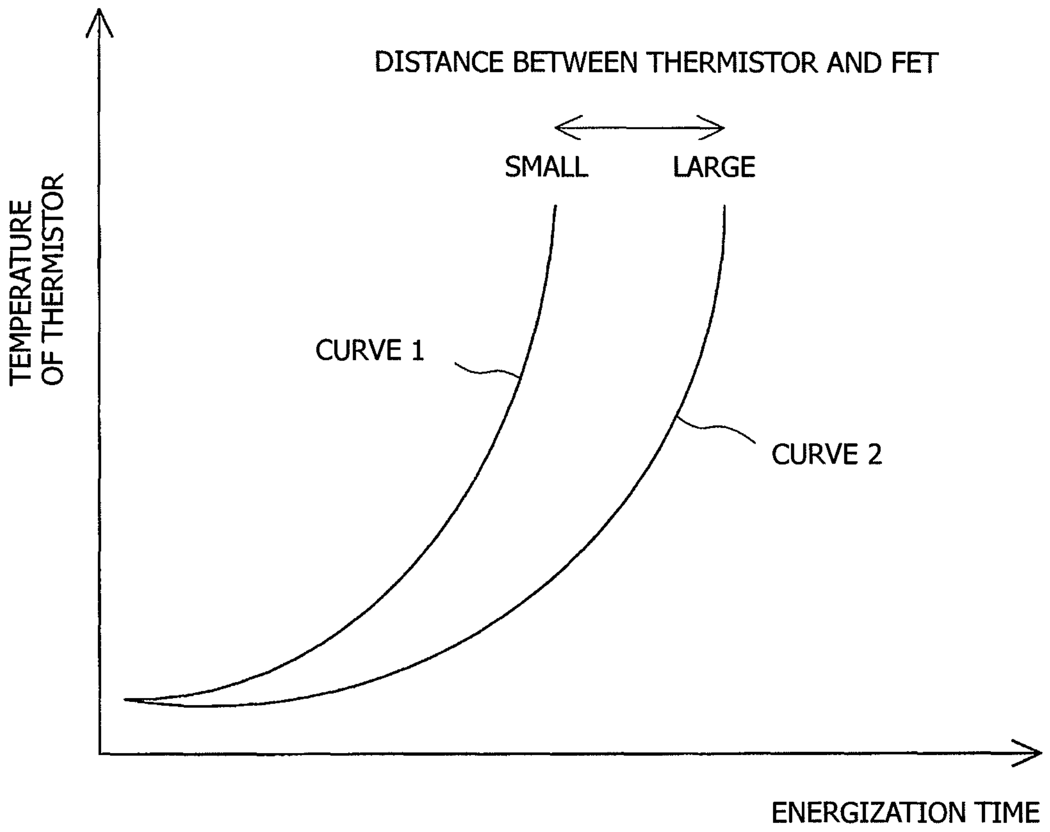
FIG. 6 is a graph showing the relation between energization time and thermistor temperature for each of thermistors which differ from one another in terms of distance from an FET.
Figure 7:
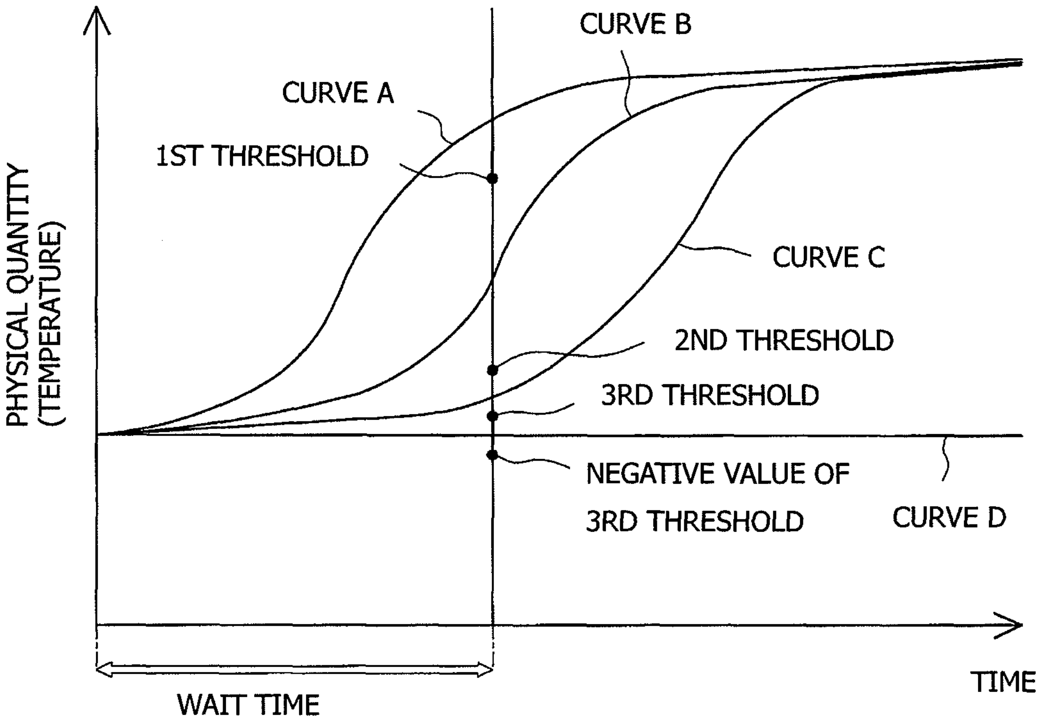
FIG. 7 is a graph illustrating a method of detecting a high-temperature-side-shift anomaly, a low-temperature-side-shift anomaly, and a nonresponsive anomaly.

(a) In the above-described embodiment, the thermistor 34 is disposed at a position relatively remote from the FET 32. However, no limitation is imposed on the position of the thermistor 34 on the substrate 37. Notably, the FET 32 generates heat upon supply of electricity. Therefore, as shown in curve 1 of FIG. 6, the temperature of a thermistor disposed at a position relatively close to the FET 32 increases at a higher rate with energization time. Meanwhile, as shown in curve 2 of FIG. 6, the temperature of a thermistor disposed at a position relatively remote from the FET 32 increases at a lower rate with energization time. Further, the rate of increase of the temperature of the thermistor with the energization time changes depending on the amount of heat generated by the FET. Accordingly, the threshold temperatures TS1, TS2 and TS3 and the wait time are desirably set in consideration of the positional relation between the thermistor 34 and the FET 32 and the amount of heat generated by the FET 32.

(b) In the above-described embodiment, when the numerical value input from the A/D converter 40 is not greater than the maximum allowable value and not less than the minimum allowable value, each of the numerical value of the wire-breakage detection counter and the numerical value of the short-circuit detection counter is decremented by one. However, the embodiment may be modified such that, when the numerical value input from the A/D converter 40 is not greater than the maximum allowable value and not less than the minimum allowable value, the numerical value of the wire-breakage detection counter and the numerical value of the short-circuit detection counter are reset to zero.

(c) Although not specifically described in the above embodiment, means may be provided for reporting to a user the anomaly mode of the thermistor 34 when the ECU 35 determines that the thermistor 34 has an anomaly.

(d) In the above-described embodiment, the energization control apparatus 30 is configured to control the supply of electric current to the glow plug 1 (metal glow plug) having the heat generation coil 9. However, the object controlled by the energization control apparatus 30 is not limited to a metal glow plug. Accordingly, the energization control apparatus 30 may be configured to control the supply of electricity to a ceramic glow plug having a ceramic heater. Further, in the above-described embodiment, the glow plug 1 is exemplified as the controlled vehicle component. However, the controlled vehicle component is not limited to a glow plug. Accordingly, the controlled vehicle component may be a heater for heating any of various sensors (an oxygen sensor, an $NO_X$ sensor, etc) mounted on a vehicle, a drive motor in a hybrid vehicle, a motor for operating a wiper, or the like.

(e) In the above-described embodiment, the energization control apparatus 30 includes an NTC thermistor. However, the present invention may be applied to an energization control apparatus including a PTC (positive thermal coefficient) thermistor. Further, the temperature-sensitive element is not limited to a thermistor, and, for example, a platinum resistor may be used as the temperature-sensitive element. Notably, in the case where a PTC thermistor or a platinum resistor is used as the temperature-sensitive element, the above-mentioned threshold temperatures, etc., may be changed appropriately.

(f) In the above-described embodiment, first and second temperatures are acquired as the first physical quantity and the second physical quantity. However, no limitation is imposed on the first physical quantity and the second physical quantity, so long as the selected first and second physical quantities contain information regarding the temperature of the thermistor 34. Accordingly, the resistance of the thermistor 34, the voltage applied to the thermistor 34, or the like can be employed as the first physical quantity and the second physical quantity.

(g) In the above-described embodiment, the energization control apparatus 30 includes the high-temperature-side-shift determination means 46 (the first determination means), the low-temperature-side-shift determination means 47 (the second determination means), the resistance-invariance determination means 48 (the third determination means), the wire-breakage determination means 43 (the fourth determination means), and the short-circuit determination means 44 (the fifth determination means). However, the energization control apparatus 30 may be configured so as to include one or more of these means.

It should further be apparent to those skilled in the art that various changes in form and detail of the invention as shown and described above may be made. It is intended that such changes be included within the spirit and scope of the claims appended hereto.

This application claims priority from Japanese Patent Application No. 2009-89981, filed Apr. 2, 2009, the disclosure of which is incorporated herein by reference in its entirety.

What is claimed is:

1. An energization control apparatus for a controlled vehicle component comprising:

switching means disposed on a substrate and generating heat when supplying electric current from a power supply to a controlled vehicle component;

a temperature-sensitive element disposed on the substrate; and anomaly detection means for detecting an anomaly of the temperature-sensitive element, wherein the anomaly detection means comprises:

temperature-difference calculation means for acquiring a first physical quantity containing information regarding temperature of the temperature-sensitive element before startup of a vehicle or within a fixed period after the startup, and for acquiring a second physical quantity containing information regarding the temperature of the same temperature-sensitive element after elapse of a predetermined wait time from the time of acquisition of the first physical quantity, and for calculating a difference between the first physical quantity and the second physical quantity; and sensitivity anomaly determination means for determining, from the difference, an anomaly of the temperature-sensitive element associated with sensitivity to a temperature to be measured.

2. The energization control apparatus for a controlled vehicle component according to claim 1, wherein the sensitivity anomaly determination means comprises at least one determination means selected from the group consisting of:

first determination means for determining whether or not the difference is greater than a predetermined first threshold;

second determination means for determining whether or not the difference is not greater than a predetermined second threshold smaller than the first threshold and is greater than a predetermined third threshold smaller than the second threshold; and third determination means for determining whether or not the absolute value of the difference is not greater than the third threshold.

3. The energization control apparatus for a controlled vehicle component according to claim 2, wherein the sensitivity anomaly determination means further comprises at least one determination means selected from the group consisting of:

fourth determination means for determining whether or not an output value based on a resistance of the temperature-sensitive element is greater than a predetermined maximum allowable value; and fifth determination means for determining whether or not the output value based on the resistance of the temperature-sensitive element is less than a predetermined minimum allowable value.

4. The energization control apparatus for a controlled vehicle component according to claim 2, wherein, when the sensitivity anomaly determination means detects an anomaly of the temperature-sensitive element associated with its sensitivity to a temperature to be measured, the supply of electric current to the controlled vehicle component is turned off.

5. The energization control apparatus for a controlled vehicle component according to claim 1, wherein the sensitivity anomaly determination means comprises at least one determination means selected from the group consisting of:

fourth determination means for determining whether or not an output value based on a resistance of the temperature-sensitive element is greater than a predetermined maximum allowable value; and fifth determination means for determining whether or not the output value based on the resistance of the temperature-sensitive element is less than a predetermined minimum allowable value.

6. The energization control apparatus for a controlled vehicle component according to claim 5, wherein, when the sensitivity anomaly determination means detects an anomaly of the temperature-sensitive element associated with its sensitivity to a temperature to be measured, the supply of electric current to the controlled vehicle component is turned off.

7. The energization control apparatus for a controlled vehicle component according to claim 1, wherein, when the sensitivity anomaly determination means detects an anomaly of the temperature-sensitive element associated with its sensitivity to a temperature to be measured, the supply of electric current to the controlled vehicle component is turned off.

8. A heat generation system comprising: an energization control apparatus for a controlled vehicle component according to claim 1; and a controlled vehicle component controlled by the energization control apparatus.

9. An energization control method performed in an energization control apparatus for a controlled vehicle component, the energization control apparatus which has a switching means disposed on a substrate and generating heat when supplying electric current from a power supply to a controlled vehicle component; and a temperature-sensitive element disposed on the substrate; and a sensitivity anomaly determination means for determining an anomaly of the temperature-sensitive element associated with sensitivity to a temperature to be measured, the method comprising:

a temperature-difference calculation step of acquiring a first temperature based on a resistance of the temperature-sensitive element at a time before startup of a vehicle or within a fixed period after startup, acquiring a second temperature based on the resistance of the same temperature-sensitive element after elapse of a predetermined wait time from the time of acquisition of the first temperature, and calculating the difference between the first and second temperatures;

a first determination step of determining whether or not the difference is greater than a predetermined first threshold temperature; a second determination step of determining whether or not the difference is not greater than a predetermined second threshold temperature lower than the first threshold temperature and is greater than a predetermined third threshold temperature lower than the second threshold temperature; and a third determination step of determining whether or not the absolute value of the difference is not greater than the third threshold temperature.

10. The energization control method according to claim 9, further comprising: a fourth determination step of determining whether or not an output value based on the resistance of the temperature-sensitive element is greater than a predetermined maximum allowable value; and a fifth determination step of determining whether or not the output value based on the resistance of the temperature-sensitive element is smaller than a predetermined minimum allowable value.

11. The energization control method according to claim 10, wherein when at least one of the determination conditions of the determination steps is satisfied, the supply of electric current to the controlled vehicle component is turned off.

12. The energization control method according to claim 9, wherein when at least one of the determination conditions of the determination steps is satisfied, the supply of electric current to the controlled vehicle component is turned off.

* * * * *